(12) United States Patent
Cheng

(10) Patent No.: US 8,054,545 B2
(45) Date of Patent: Nov. 8, 2011

(54) LENS HOOD FOR A CAMERA LENS

(75) Inventor: Ming-Chung Cheng, Taichung (TW)

(73) Assignee: Donell Optronics Co., Ltd.

( * ) Notice: Subject to any disclaimer, the term of this patent is extended or adjusted under 35 U.S.C. 154(b) by 792 days.

(21) Appl. No.: 12/127,591

(22) Filed: May 27, 2008

(65) Prior Publication Data

US 2009/0296221 A1 Dec. 3, 2009

(51) Int. Cl.
*G02B 23/00* (2006.01)
(52) U.S. Cl. .......................... 359/425; 359/426; 359/611
(58) Field of Classification Search .................. 359/611, 359/612, 425, 426
See application file for complete search history.

(56) References Cited

U.S. PATENT DOCUMENTS

2005/0200959 A1* 9/2005 Yamamoto .................... 359/600
* cited by examiner

*Primary Examiner* — Joshua L Pritchett
(74) *Attorney, Agent, or Firm* — Hershkovitz & Associates, LLC; Abraham Hershkovitz

(57) ABSTRACT

A lens hood for a camera lens has a mounting barrel and a holding ring. The mounting barrel is hollow, is movably mounted around the camera lens and has an internal surface, a front end, a rear end, a sliding recess and at least one detent. The sliding recess if formed in the internal surface of the mounting barrel and has two ends. The at least one detent is formed adjacent to, communicating with and deeper than the sliding recess; two detents may be formed respectively at the ends of the sliding recess. The holding ring is resilient, is mounted securely around the cameras lens, is mounted in and presses the sliding recess and is selectively mounted in the at least one detent to allow the holding ring to relax and prolong usage lifetime.

7 Claims, 6 Drawing Sheets

US 8,054,545 B2

LENS HOOD FOR A CAMERA LENS

BACKGROUND OF THE INVENTION

1. Field of the Invention

The present invention relates to a lens hood, and more particularly to a lens hood for a camera lens.

2. Description of Related Art

With reference to FIG. 6, a conventional lens hood (50) is movably mounted around a camera lens (40) to shade a lens from external light sources and to avoid the external light source adversely affecting a final image by glare and lens flare. The conventional lens hood (50) has a mounting barrel (51) and a holding ring (52). The mounting barrel (51) is mounted around the camera lens (40) and has an internal surface (511). The holding ring (52) is mounted securely on an external surface of the camera lens (40) and is pressed against the internal surface (511) of the mounting barrel (51) to hold the mounting barrel (51) on the camera lens (40) using friction.

However, the internal surface of the mounting barrel (51) has a constant diameter, so the holding ring (52) is pressed by the internal surface (511) of the mounting barrel (51) against the external surface of the camera lens (40), and the holding ring (52) may wear down after prolonged use and cannot hold the mounting barrel (51) on the camera lens (40) securely. Therefore, lifetime of the conventional lens hood (50) is dictated by the holding ring (52). In addition, if the holding ring (52) is made to be replaceable, this will increase cost of production.

The lens hood for a camera lens in accordance with the present invention mitigates or obviates the aforementioned problems.

SUMMARY OF THE INVENTION

The main objective of the present invention is to provide a lens hood for a camera lens.

The lens hood for a camera lens in accordance with the present invention has a mounting barrel and a holding ring. The mounting barrel is hollow, is movably mounted around the camera lens and has an internal surface, a front end, a rear end, a sliding recess and at least one detent. The sliding recess if formed in the internal surface of the mounting barrel and has two ends. The at least one detent is formed adjacent to, communicating with and deeper than the sliding recess; two detents may be formed respectively at the ends of the sliding recess. The holding ring is resilient, is mounted securely around the cameras lens, is mounted in and presses the sliding recess and is selectively mounted in the at least one detent to allow the holding ring to relax and prolong usage lifetime.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
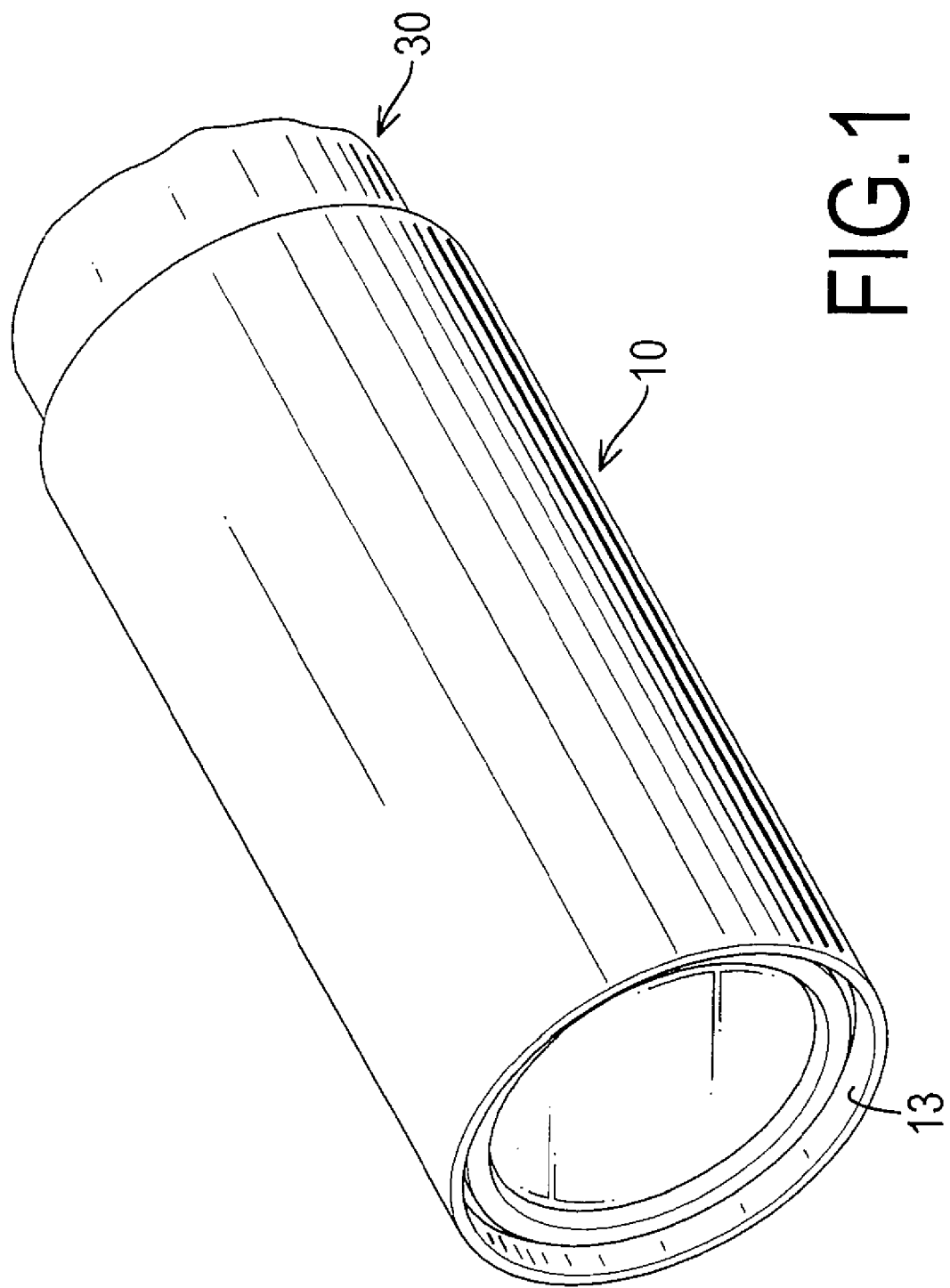
FIG. 1 is a perspective view of a lens hood in accordance with the present invention mounted around a camera lens.
Figure 2:
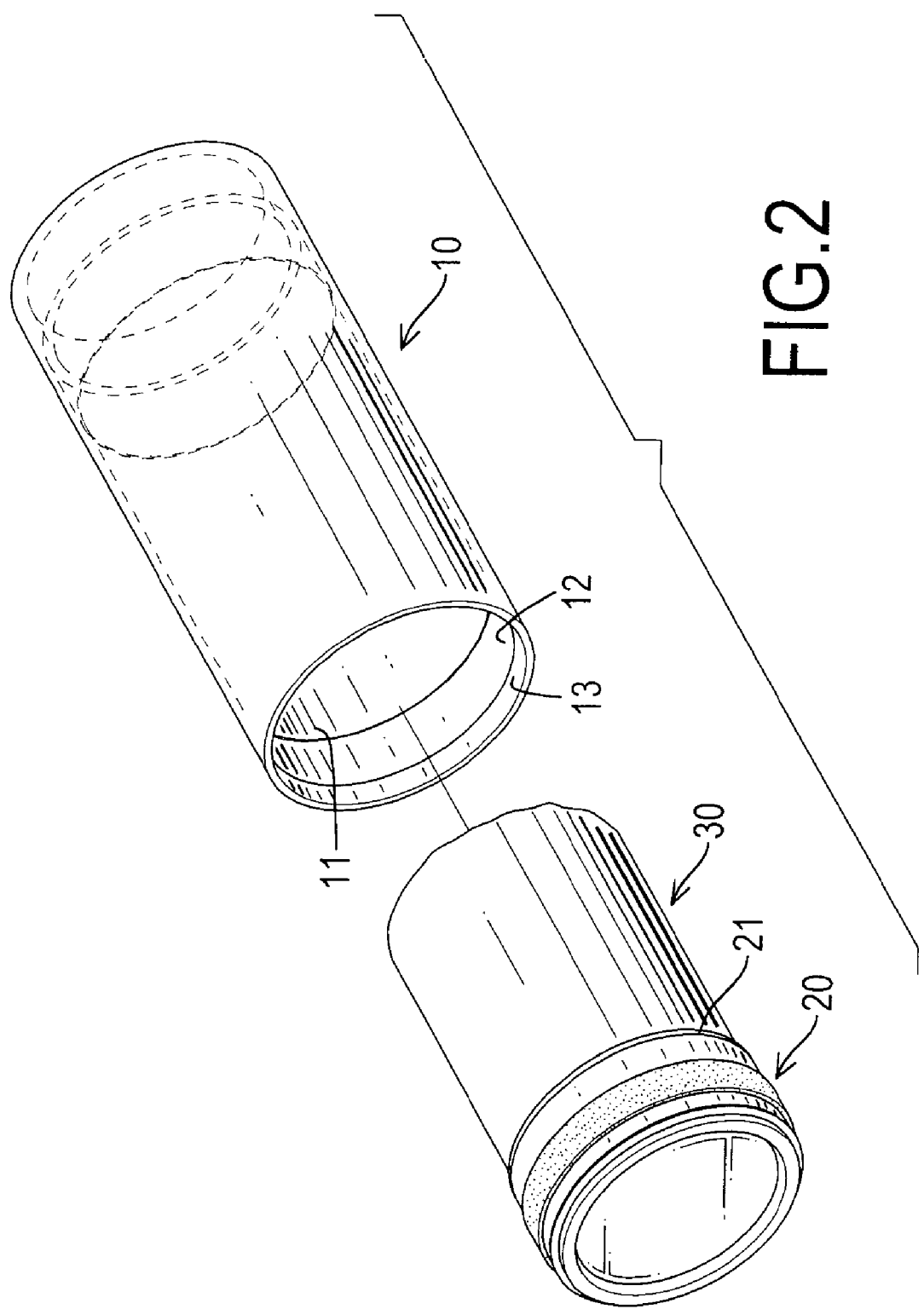
FIG. 2 is a partially exploded perspective view of the lens hood in FIG. 1, partially shown in phantom lines.
Figure 3:
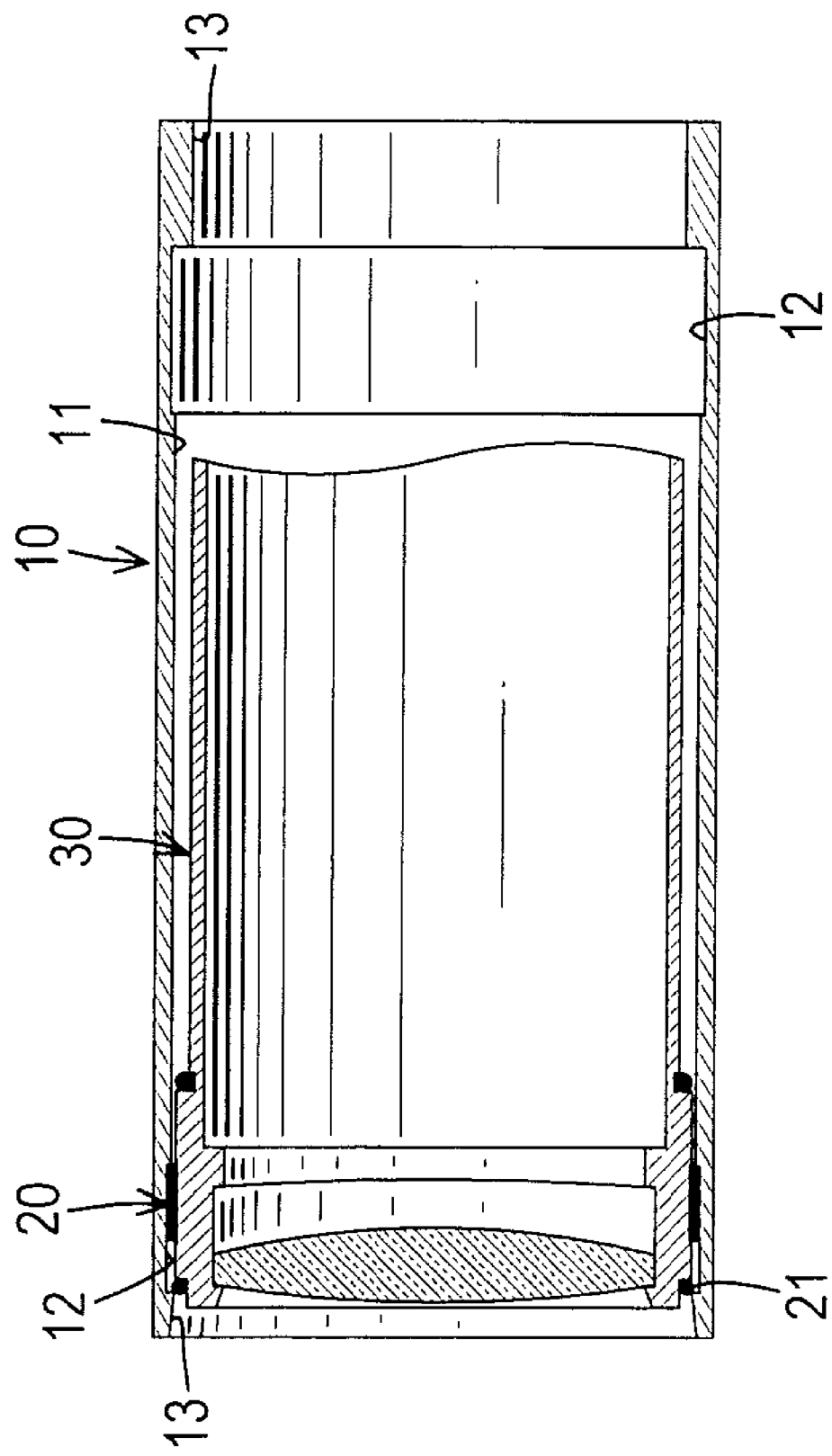
FIG. 3 is an operational cross sectional side view of the lens hood in FIG. 1 mounted around the camera lens, shown retracted.

With reference to FIGS. 1 to 3, a lens hood in accordance with the present invention for a camera lens (30) having an external surface has a mounting barrel (10) and a holding ring (20). The mounting barrel (10) is hollow, is movably and axially mounted around the camera lens (30) and has an internal surface, a front end, a rear end, a sliding recess (11), at least one detent (12) and two flanges (13).

The sliding recess (11) is formed in the internal surface of the mounting barrel (10) and has a front and rear end.

The at least one detent (12) is formed annularly in the internal surface of the mounting barrel (10), is selectively formed at the front end and the rear end of the sliding recess (11), be adjacent to, communicate with and be recessed deeper than the sliding recess (11) and each one of the at least one detent (12) has a width. Preferably, two detents (12) are formed in the internal surface of the mounting barrel (10) respectively adjacent to and communicating with the front and rear ends of the sliding recess (11) and adjacent to front and rear ends of the mounting barrel (10).

Figure 4:
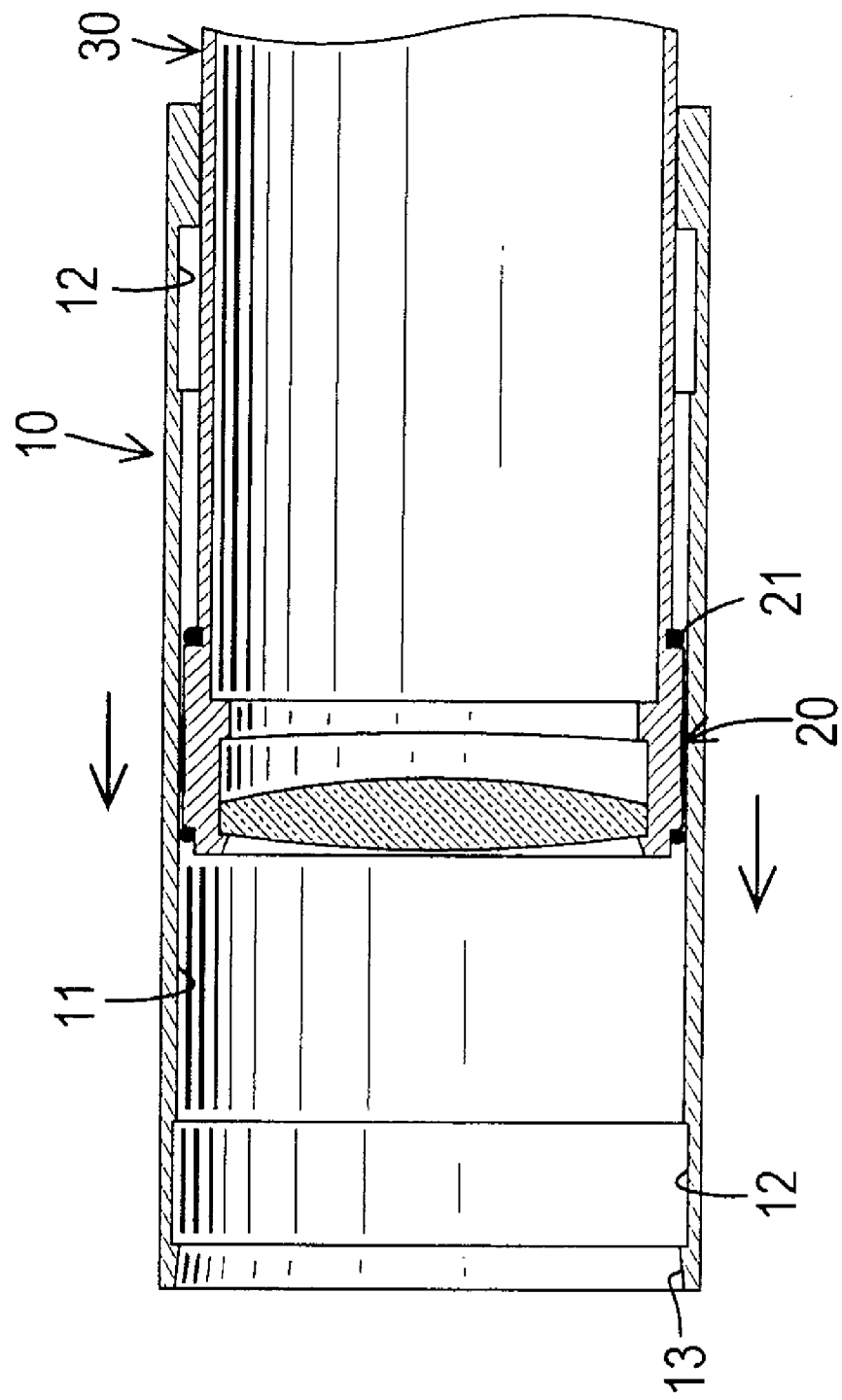
FIG. 4 is an operational cross sectional side view of the lens hood in FIG. 3 mounted around the camera lens, shown being extended.

With further reference to FIG. 4, the flanges (13) are respectively formed on and protrude from the internal surface of the mounting barrel (10) at the front end and the rear end of the mounting barrel (10) to prevent the mounting barrel (10) separating from the camera lens (30). The flange (13) formed at the front end of the mounting barrel (10) may be tapered to allow more light in from the front end of the mounting barrel (10).

The holding ring (20) is resilient, mounted securely around the external surface of the cameras lens (30) and abuts the internal surface of the mounting barrel (10) and being selectively mounted in the at least one detent (12) when the mounting barrel (10) moves relative to the camera lens (30) and has a width smaller than the width of the at least one detent (12) to enable the holding ring (20) to mount in the at least one detent (12).

Preferably, the holding ring (20) has two bearings (21). The bearings (21) are mounted around the external surface of the camera lens (30) and selectively abut corresponding flanges (13) in the mounting barrel (10) when the mounting barrel (10) moves relative to the camera lens (30).

Figure 5:
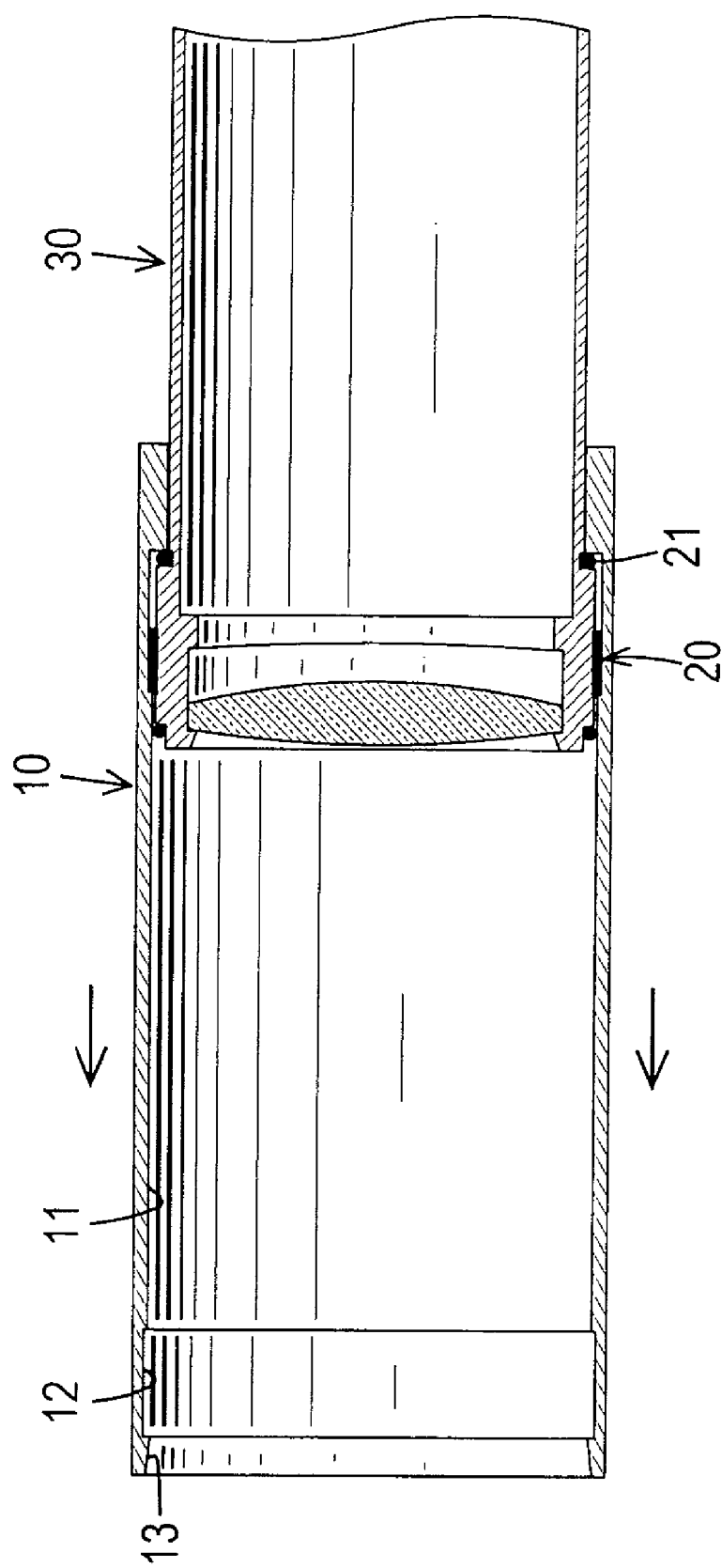
FIG. 5 is another operational cross sectional side view of the lens hood in FIG. 3 mounted around the camera lens, shown extended.
Figure 6:
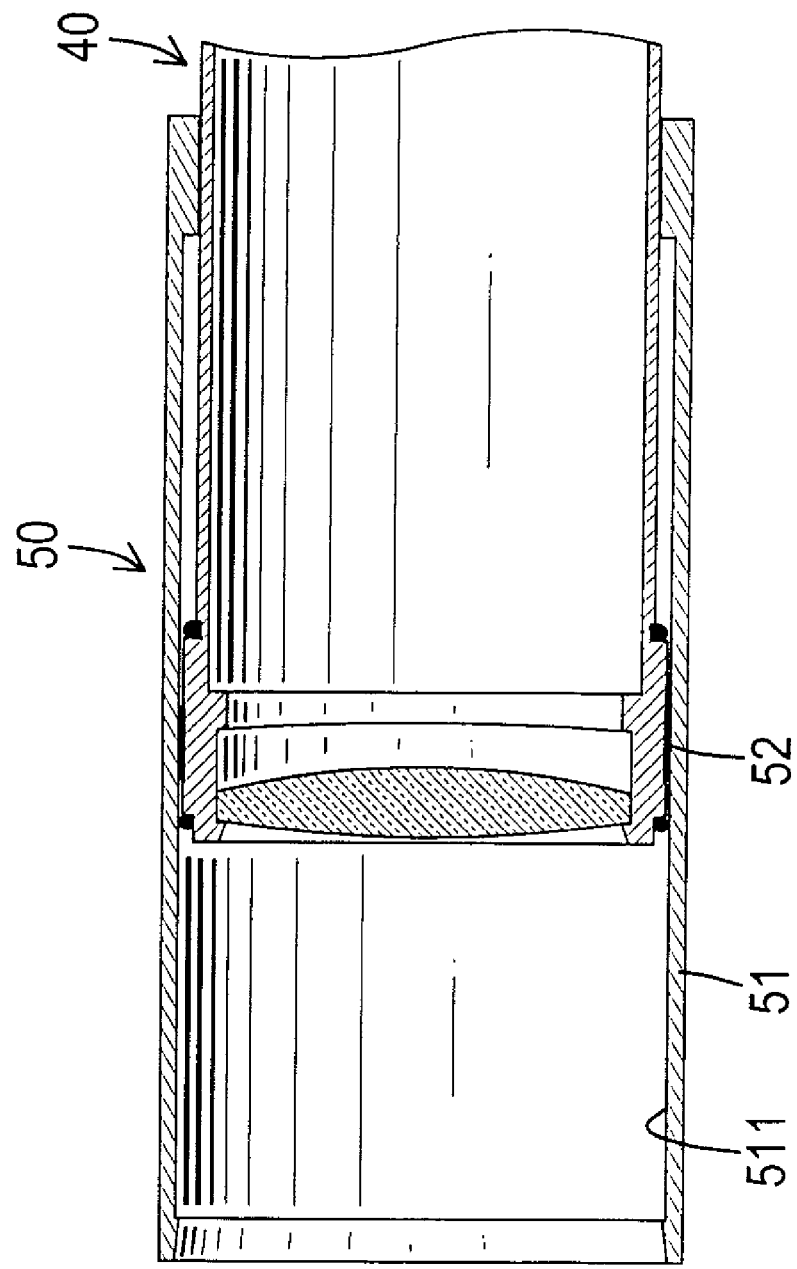
FIG. 6 is a cross sectional side view of a lens hood in accordance with the prior art mounted around a camera lens.

With further reference to FIG. 5, when the holding ring (20) is disposed in the at least one detent (12) in the mounting barrel (10), the mounting barrel (10) is held on the camera lens (30) by the holding ring (20) abutting a corresponding detent (12). When the mounting barrel (10) moves relative to the camera lens (30), the holding ring (20) is forced out of the at least one detent (12) and presses the sliding recess (11) of the mounting barrel (10).

The lens hood for a camera lens (30) has the following advantages.

1. The diameters of the detent (12) and the sliding recess (11) are different, and the holding ring (20) is not constantly pressed between the mounting barrel (10) and the camera lens (30), so the holding ring (20) relaxes when in the at least one detent (12) and is compressed when not in the at least one detent (12). Therefore lifetime of the lens hood (50) is increased.

2. The at least one detent (12) prevents the holding ring (20) from breaking so reduces the cost of production. Even though numerous characteristics and advantages of the present invention have been set forth in the foregoing description, together with details of the structure and features of the utility model, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A lens hood for a camera lens having an external surface, the lens hood having
   a mounting barrel being hollow, being configured to be movably and axially mounted around the camera lens and having
      an internal surface;
      a front end;
      a rear end;
      a sliding recess being formed in the internal surface of the mounting barrel and having a front and a rear end; and
      at least one detent being located annularly and around the entire circumference of the internal surface of the mounting barrel, being selectively located at the front end and the rear end of the sliding recess, being adjacent to, communicating with, and being recessed deeper than the sliding recess, each one of the at least one detent having a width; and
   a holding ring being resilient, being configured to be mounted securely around the external surface of the camera lens and abutting the internal surface of the mounting barrel and being selectively mounted in the at least one detent to prevent the holding ring from constantly being pressed between the mounting barrel and the camera lens and having a width smaller than the width of the at least one detent to enable the holding ring to mount in the at least one detent.

2. The lens hood as claimed in claim 1, wherein the mounting barrel has two detents being formed in the internal surface adjacent to and communicating with the front and rear ends of the sliding recess and adjacent to the front and rear ends of the mounting barrel.

3. The lens hood as claimed in claim 2, wherein the mounting barrel further has two flanges being respectively formed on and protruding from the internal surface of the mounting barrel at the front and rear ends.

4. The lens hood as claimed in claim 3, wherein the holding ring further has two bearings being configured to be mounted around the external surface of the camera lens to selectively abut the flanges in the mounting barrel.

5. The lens hood as claimed in claim 1, wherein the mounting barrel further has two flanges being respectively formed on and protruding from the internal surface of the mounting barrel at the front and rear ends.

6. The lens hood as claimed in claim 5, wherein the holding ring further has two bearings being configured to be mounted around the external surface of the camera lens to abut with the flanges in the mounting barrel when the mounting barrel moves relative to the camera lens.

7. The lens hood as claimed in claim 1, wherein the mounting barrel is configured such that the camera lens translates axially inside the mounting barrel without rotation with respect to the axis of the mounting barrel.

* * * * *